US012716365B2

(12) United States Patent
Levisse et al.

(10) Patent No.: US 12,716,365 B2
(45) Date of Patent: Aug. 25, 2026

(54) TURBINE ENGINE MODULE EQUIPPED WITH A PROPELLER AND STATOR VANES CARRIED BY TWO CASINGS AND CORRESPONDING TURBINE ENGINE

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR); Guillaume Glemarec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/246,264

(22) PCT Filed: Sep. 29, 2021

(86) PCT No.: PCT/FR2021/051679

§ 371 (c)(1),
(2) Date: Mar. 22, 2023

(87) PCT Pub. No.: WO2022/069834

PCT Pub. Date: Apr. 7, 2022

(65) Prior Publication Data

US 2023/0358149 A1 Nov. 9, 2023

(30) Foreign Application Priority Data

Sep. 29, 2020 (FR) ....................................... 2009934

(51) Int. Cl.
*F01D 17/16* (2006.01)

(52) U.S. Cl.
CPC ...... *F01D 17/162* (2013.01); *F05D 2220/323* (2013.01)

(58) Field of Classification Search
CPC ......................... F01D 17/162; F05D 2220/323
See application file for complete search history.

(56) References Cited

U.S. PATENT DOCUMENTS

| | | | | |
|---|---|---|---|---|
| 4,275,560 A * | 6/1981 | Wright | F02K 3/075 60/226.3 |
| 4,363,600 A * | 12/1982 | Thebert | F01D 17/162 415/140 |

(Continued)

FOREIGN PATENT DOCUMENTS

| | | |
|---|---|---|
| EP | 3093437 A1 | 11/2016 |
| EP | 3093443 A1 | 11/2016 |
| EP | 3225813 A1 | 10/2017 |

OTHER PUBLICATIONS

International Search Report and Written Opinion received for PCT Patent Application No. PCT/FR2021/051679, mailed on Jan. 21, 2022, 18 pages (9 pages of English Translation and 9 pages of Original Document).

*Primary Examiner* — Nathaniel E Wiehe
*Assistant Examiner* — Aye S Htay
(74) *Attorney, Agent, or Firm* — Womble Bond Dickinson (US) LLP

(57) ABSTRACT

A turbine engine module of longitudinal axis X, including an unducted propeller intended to be rotated around the longitudinal axis X by a power shaft which is connected at least to a rotor member, at least one flow straightener including a plurality of stator vanes extending along a radial axis Z, at least one first casing mounted upstream, along the longitudinal axis, of the rotor member and a second casing mounted downstream, along the longitudinal axis, of the rotor member. The stator vanes each include a root housed in a sleeve which is connected to the first casing and to the second casing.

18 Claims, 3 Drawing Sheets

(56) References Cited

U.S. PATENT DOCUMENTS

| | | | | | |
|---|---|---|---|---|---|
| 4,430,043 | A * | 2/1984 | Knight | F04D 29/563 | |
| | | | | 415/149.4 | |
| 4,486,146 | A * | 12/1984 | Campion | B64C 11/48 | |
| | | | | 416/129 | |
| 5,263,898 | A * | 11/1993 | Elston, III | B64C 11/06 | |
| | | | | 416/129 | |
| 7,690,889 | B2 * | 4/2010 | Giaimo | F01D 17/162 | |
| | | | | 415/160 | |
| 2016/0333729 | A1 | 11/2016 | Miller et al. | | |
| 2016/0333734 | A1 | 11/2016 | Bowden et al. | | |
| 2017/0102006 | A1 * | 4/2017 | Miller | F04D 29/563 | |
| 2017/0284304 | A1 | 10/2017 | Nestico et al. | | |

* cited by examiner

TURBINE ENGINE MODULE EQUIPPED WITH A PROPELLER AND STATOR VANES CARRIED BY TWO CASINGS AND CORRESPONDING TURBINE ENGINE

FIELD OF THE INVENTION

The present invention relates to the field of turbine engine and in particular to a turbine engine module comprising an unducted propeller and a straightener with stator vanes. It also applies to the corresponding turbine engine.

TECHNICAL BACKGROUND

Turbine engines comprising at least one unducted propeller are known as "open rotor" or "unducted fan". In this category of turbine engine, there are those with two unducted and counter-rotating propellers (known as UDF for "Unducted Dual Fan") or those with a single unducted propeller and a straightener comprising several stator vanes (known as USF for "Unducted Single Fan"). The propeller or the propellers forming the propulsion portion may be placed at the rear of the gas generator (or engine) so as to be of the pusher type or at the front of the gas generator so as to be of the puller type. These turbine engines are turboprop engines that differ from turbojet engines by the use of a propeller outside the nacelle (unducted) instead of an internal fan. This allows to increase the bypass ratio very significantly without being penalized by the mass of the casings or nacelles intended to surround the blades of the propeller or fan. Examples of such a turbine engine are described in the documents EP-A1-3093437, EP-A1-3093443 and EP-A1-3225813.

Currently, this type of turbine engine, and in particular the turbine engines USF, have a length along its longitudinal axis of rotation that is quite large, so that the mass is impacted and also generates a large amount of noise. This noise is caused by the gas generator but mainly by the interaction of the wake and vortex generated by the winding of the current lines at the top of the vanes of the propeller and the vanes of the straightener. This noise is louder the closer the stator vanes are to the vanes of the propeller. Indeed, the stator vanes of the turbine engines are generally installed on an inlet casing which carries the splitter nose of the primary and secondary flows circulating respectively in a primary duct and around the inlet casing. However, moving the stator vanes of the straightener away from the vanes of the propeller goes against the optimisation of mass and overall dimension; compacting the turbine engine as much as possible is also a problem.

SUMMARY OF THE INVENTION

The objective of the present invention is to provide a turbine engine module with stator vanes arranged so as to reduce the acoustic impact of unducted turbine engines while avoiding lengthening the turbine engine.

This objective is achieved in accordance with the invention by means of a turbine engine module with a longitudinal axis X, comprising an unducted propeller intended to be driven in rotation about the longitudinal axis X by a power shaft which is connected to at least one rotor member, at least one straightener comprising a plurality of stator vanes extending along a radial axis Z, at least one first casing mounted upstream, along the longitudinal axis, of the rotor member and a second casing mounted downstream, along the longitudinal axis, of the rotor member, the stator vanes each comprising a root housed in a sleeve which is connected on the one hand to the first casing and on the other hand to the second casing.

Thus, this solution allows to achieve the above-mentioned objective. In particular, the fact that the vanes of the straightener are offset between a first casing and a second casing instead of being carried by the inlet casing, as in the prior art, allows to reduce the noise generated by this type of turbine engine because the distance between the propeller and the straightener has been increased. With such an arrangement, where the vanes of the straightener are carried by two casings, it is possible to facilitate the integration of auxiliaries in the inlet casing (e.g. lubricant auxiliaries to lubricate and cool a reduction gear or a pitch change system for changing the pitch of the blades of vanes, etc.). As the first and second casings are already present in the turbine engine, the arrangement of means for supporting stator vanes between these two casings avoids lengthening the turbine engine. In addition, the centre of gravity has been moved downstream of the turbine engine, which means less overhang for the suspension of the turbine engine on an aircraft. Finally, the maintenance of the vanes of the straightener and elements (such as a compressor, etc.) located in the vicinity of the vanes is improved by dismounting and pivoting one or more vanes and/or lifting connecting rods, for example.

The module also comprises one or more of the following characteristics, taken alone or in combination:

- the module comprises a plurality of connecting rods extending between the first casing and the second casing, each connecting rod carrying a sleeve.
- each connecting rod comprises a first end mounted on a first radially external shroud of the first casing by a ball joint type connection and a second end mounted on a second radially external shroud of the second casing by an embedded type connection.
- each connecting rod is made in one-piece with a sleeve.
- the stator vanes of the straightener are variable in pitch setting and in that the module comprises a pitch change system for changing the pitch of the blades of the stator vanes which is arranged radially outside the second casing.
- the stator vanes of the straightener are unducted.
- at least one rotational guide bearing for guiding in rotation a root of a stator vane is housed in an internal housing of a sleeve.
- the stator vanes are evenly distributed around the longitudinal axis X and extend radially into a secondary air flow.
- the first casing is an inlet casing which carries a splitter nose for dividing an air flow into a primary air flow and a secondary air flow, the inlet casing comprising a first radially internal shroud, the first radially external shroud and between which extends at least a first radial structural arm.
- the second casing is an inter-compressor casing arranged downstream of a low-pressure compressor, along the longitudinal axis, the inter-compressor casing comprising a second radially internal shroud, the second radially external shroud which are coaxial with the longitudinal axis X and between which extends at least one second radial structural arm.
- the ratio S/C corresponding to the distance S between a trailing edge of the vanes of the propeller and a leading edge of a stator vane on the chord C of the vanes of the propeller is of the order 3.
- the rotor member is a low-pressure compressor.
- the straightener is located downstream of the propeller.

the connecting rods are made of titanium.

the pitch change system for changing the pitch of the blades of the propeller comprises at least one control means comprising a stationary body and an axially movable body with respect to the stationary body, and a connection mechanism connecting each stator vane to the movable body of the control means.

the first casing and second casing are separated by the rotor member along the longitudinal axis X.

the first and second casings are contiguous.

The invention further relates to an aircraft turbine engine comprising at least one module having any of the foregoing characteristics and a gas generator downstream of the propeller.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
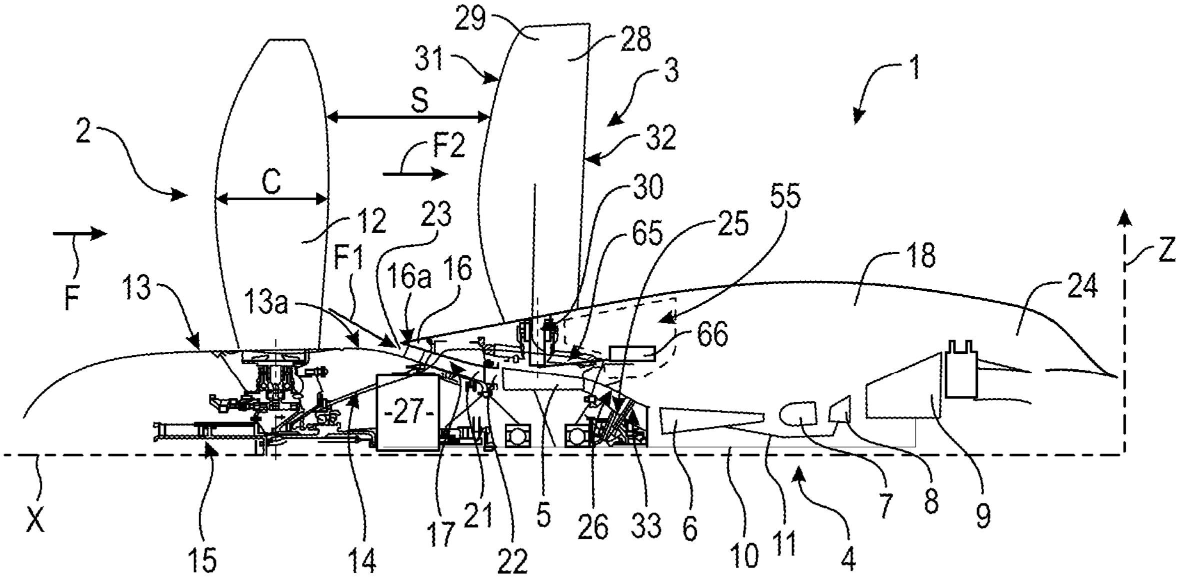
FIG. 1 is a schematic view, in axial and partial cross-section, of an example of turbine engine with a single unducted propeller to which the invention applies.

The invention applies to a turbine engine 1 comprising a single unducted propeller 2 and a straightener 3 downstream of the propeller 2. The turbine engine is intended to be mounted on an aircraft. Such a turbine engine is a turboprop engine as shown in FIG. 1. This turbine engine is known as the “Unducted Single Fan” as explained above. Of course, the invention is applicable to other types of turbine engine.

Figure 2:
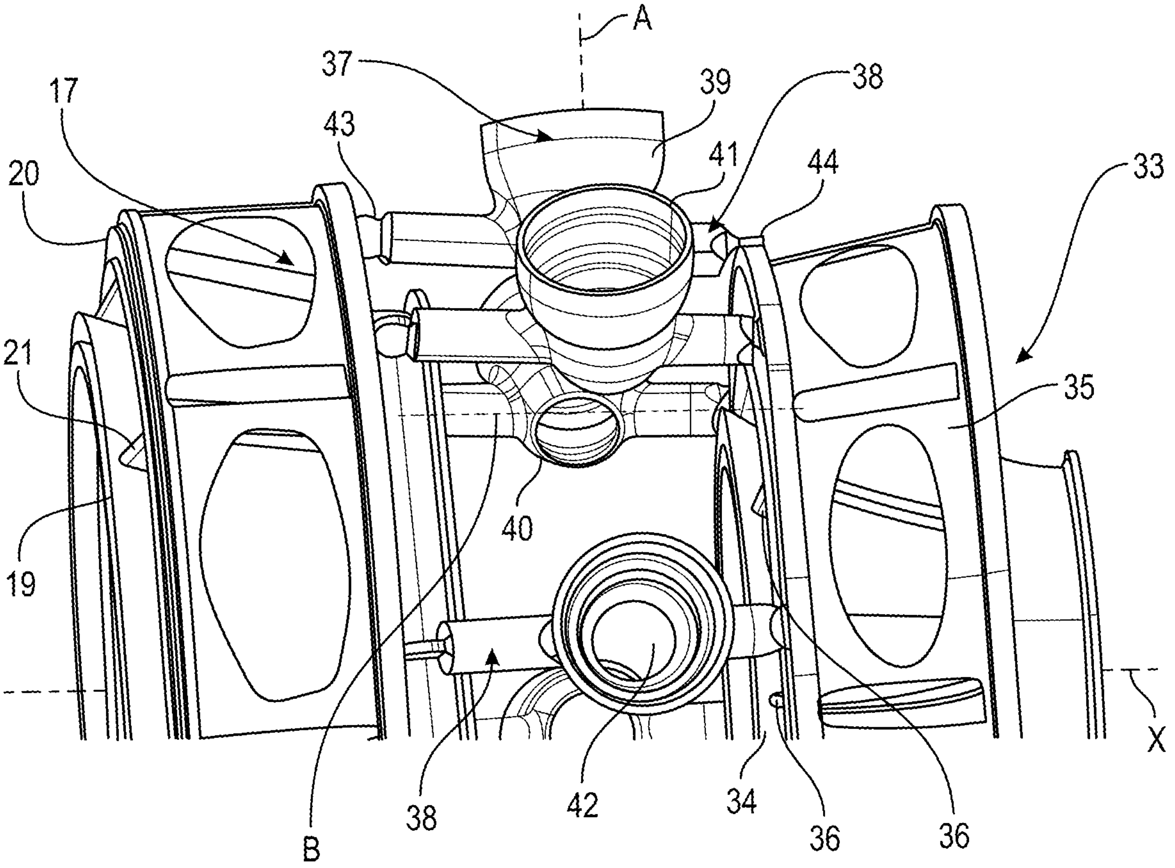
FIG. 2 shows a perspective view of an inlet casing connected to an inter-compressor casing by a set of connecting rods, each of which carries a sleeve intended to receive the root of a straightener stator vane according to the invention.

In the present invention, and in general, the terms “upstream”, “downstream”, “axial” and “axially” are defined with respect to the circulation of the gases in the turbine engine and here along the longitudinal axis X (and even from left to right in FIG. 2). Similarly, the terms “radial”, “internal” and “external” are defined with respect to a radial axis Z perpendicular to the longitudinal axis X and with respect to the distance from the longitudinal axis X.

To facilitate its manufacture and assembly, a turbine engine is generally modular, i.e., it comprises several modules that are manufactured independently of each other and then assembled together. The modularity of a turbine engine also facilitates its maintenance. In the present application, “turbine engine module” means a module which comprises, in particular, a fan and its power shaft for driving the propeller.

In FIG. 1, the turbine engine 1 comprises a gas generator 4 which typically comprises, from upstream to downstream, a low-pressure compressor 5, a high-pressure compressor 6, a combustion chamber 7, a high-pressure turbine 8 and a low-pressure turbine 9. The low-pressure compressor 5 and the low-pressure turbine 9 are mechanically connected by a low-pressure shaft 10 so as to form a low-pressure body. The high-pressure compressor 6 and the high-pressure turbine 8 are mechanically connected by a high-pressure shaft 11 so as to form a high-pressure 10 body. The high-pressure shaft 11 extends radially outside the low-pressure shaft 10 and are coaxial.

In another configuration not shown, the low-pressure body comprises the low-pressure compressor which is connected to an intermediate pressure turbine. A free power turbine is mounted downstream of the intermediate pressure turbine and is connected to the propeller described below via a power transmission shaft to drive it in rotation.

The unducted propeller 2 is formed by a movable blade ring 12 which extend from a rotating casing 13 which is centred and movable in rotation about the longitudinal axis X. The rotating casing 13 is movably mounted with respect to an internal casing 14 which extends downstream of the rotating casing 13. In the example shown in FIG. 1, the propeller 2 is mounted upstream of the gas generator 4 (puller configuration). Alternatively, the propeller is mounted downstream of the gas generator (pusher configuration). The blades of the propeller 2 may be variable in pitch setting by means of a pitch change system 15.

An air flow F entering the turbine engine splits into a primary air flow F1 and a secondary air flow F2 at the level of a splitter nose 16. The latter is carried by an inlet casing 17 centred on the longitudinal axis. The inlet casing 17 is extended downstream by an external casing or inter-duct casing 18. The inlet casing 17, shown more specifically in FIG. 2, comprises a radially internal shroud 19 and a radially external shroud 20 which are centred on the axis X. A plurality of structural arms 21 extend radially between the radially internal shroud 19 and the radially external shroud 20. The arms 21 are stationary and are made integral with the internal and external shrouds 19, 20.

The primary air flow F1 circulates in a primary duct 22 which goes through the gas generator 4. In particular, the primary air flow F1 enters the gas generator 4 through an annular air inlet 23 and exits through a primary nozzle 24 which is arranged downstream of the gas generator 4. The air inlet 23 is radially delimited at least partly by a radially internal wall 16*a* of the splitter nose 16 which is annular and centred on the axis X and by a radially external wall 13*a* of the rotating casing 13.

The primary duct 22 (into which the air inlet 23 opens) is radially delimited by a radially internal wall 25 and a radially external wall 26. The radially internal wall 25 is formed at least partly by the radially internal shroud 19 of the inlet casing 17. The radially external wall 26 is formed at least partly by the radially external shroud 20 of the inlet casing 17. As for the secondary flow F2, it circulates around the inlet casing 17.

The power shaft or low-pressure shaft 10 (of the free power turbine and the low-pressure turbine respectively) drives the propeller 2 which compresses the air flow outside the external casing and provides most of the thrust. Optionally, a reduction gear 27 is interposed between the propeller 2 and the power shaft as shown in FIG. 1. The reduction gear 27 can be of the planetary gear train or epicyclic gear train type.

The straightener 3 comprises a plurality of stator vanes 28 (or stationary vanes) known as “OGV” for Outlet Guide Vane. The stator vanes 28 are evenly distributed around the longitudinal axis X and extend radially into the secondary air flow F2. The stator vanes 28 of the straightener 3 are arranged downstream of the blades 12 of the propeller 2 so as to straighten the air flow generated by them. Each stator vane 28 comprises a blade 29 extending radially from a root 30. It is understood, as also shown in FIG. 1, that the stator vanes 28 of the straightener are unducted. The turbine engine shown is a USF, there is no fairing of the propeller and straightener. The blades 29 also each comprise an axially opposed leading edge 31 and trailing edge 32. The stator vanes also extend radially outside the inter-duct casing 18. There are between six and fourteen stator vanes 28 around the inlet casings 17 and inter-duct 18.

As can be seen in FIG. 1, the roots 30 of the stator vanes of the straightener are mounted between a first casing and a second casing along the longitudinal axis. In this example, the first casing is the inlet casing 17 and the second casing is an inter-compressor casing 33.

The inter-compressor casing 33 is arranged downstream of the low-pressure compressor 5. More specifically, the inter-compressor casing 33 extends axially between the low-pressure compressor 5 and the high-pressure compressor 6. More precisely still and with reference to FIG. 1, the first casing (inlet casing 17) and the second casing (here the inter-compressor casing 33) are separated axially by the rotor member (here the low-pressure compressor). Each compressor comprises at least one rotor stage and at least one stator stage arranged along the longitudinal axis X. Furthermore, as shown in FIG. 2, the inter-compressor casing 33 comprises a radially internal shroud 34 and a radially external shroud 35 which are coaxial and centred on the axis X. At least one radial structural arm 36 extends radially between the radially internal shroud 34 and the radially external shroud 35. Specifically, a number of radial arms 36 are attached to the radially internal and external shrouds 34, 35. The radial arms 36 are also evenly distributed around the longitudinal axis X. They are between six and ten radial arms so as to optimise the mechanical strength of the inter-compressor casing 33. These arms 36 are stationary and are made integral with the internal and external shrouds 34, 36. The radially internal shroud 34 forms at least partly the radially internal wall 25 of the primary duct 22 while the radially external shroud 35 forms at least part of the radially external wall 26 of the primary duct 22. The primary flow F1 flows between the first radial arms 21 of the inlet casing 17 and the second radial arms 36 of the inter-compressor casing 33.

With reference to FIGS. 1 and 2, the stator vanes 28 are carried by a sleeve 37 which is connected to the inlet casing 17 on the one hand and to the inter-compressor casing 33 on the other. Each sleeve 37 is carried by a connecting rod 38 which allows the aerodynamic forces acting on the stator vanes 28 to be transmitted, as well as the thrust forces transmitted by the inter-compressor casing 33. Each sleeve 37 is cylindrical and extends radially towards the outside. The base of each sleeve 37 is circular. In particular, each sleeve 37 comprises a cylindrical skirt 39 with axis A parallel to the radial axis Z. The cylindrical skirt 39 extends radially between a first border 40 and a second border 41. Each sleeve 37 comprises a bore 42 which passes through the cylindrical skirt 39 on either side along its axis A. Each bore 42 forms an internal housing for receiving the root 30 of a stator vane 28.

Figure 3:
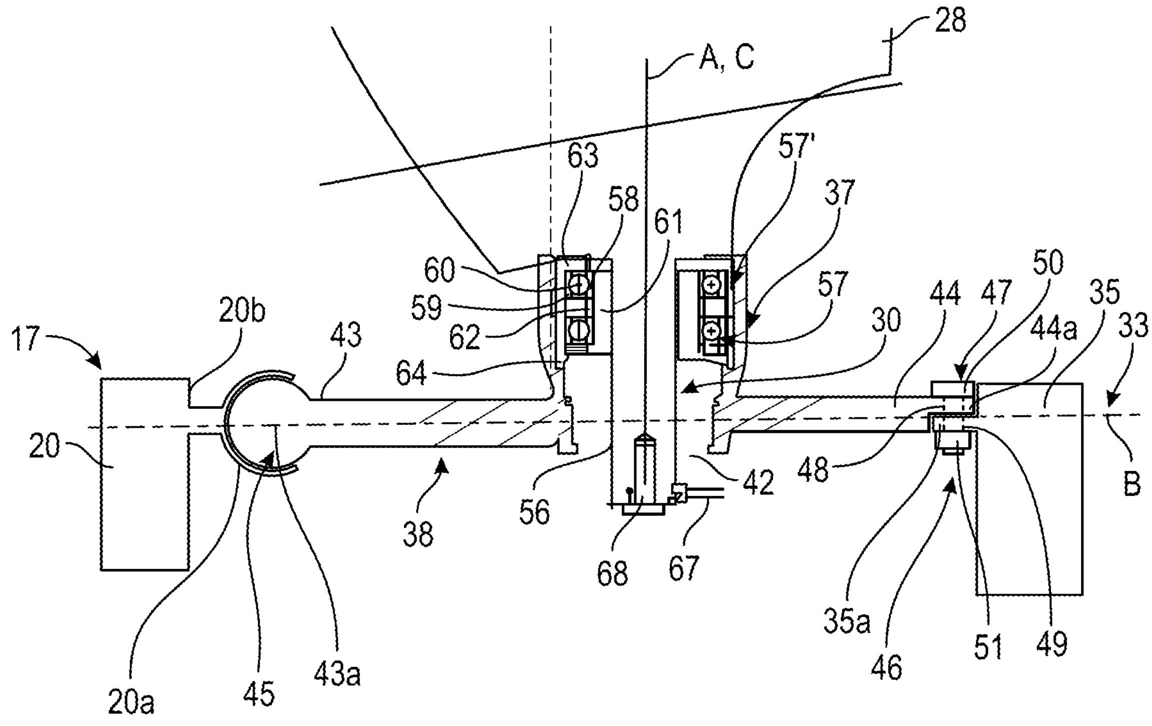
FIG. 3 illustrates in axial and partial cross-section an embodiment of a stator vane root of turbine engine mounted in a sleeve according to the invention.

As can be seen in FIG. 2, each connecting rod 38 is elongated and extends generally along an axis B parallel to the longitudinal axis X. In particular, a connecting rod 38 comprises a first end 43 and a second end 44 which are opposite along its axis B. The first end 43 of each connecting rod 38 is mounted on the radially external shroud 20 of the inlet casing 17 by a ball joint type connection 45. The ball joint connection 45 is formed by a ball head and a shell of complementary shape to the ball head as shown in FIG. 3. In the present example, each first end 43 comprises a ball head 43*a* for this purpose. Each head 43*a* is received in a shell 20*a* of substantially complementary shape. The shell 20*a* serves as a housing for the ball head 43*a*. The shell 20*a* is carried by the radially external shroud 20. In particular, the shell 20*a* extends from an annular, radial partition 20*b* of the radially external shroud 20. The ball head 43*a* is mounted so as to be movable in rotation about the axis B on the one hand, and pivotally movable about the axis B at a predetermined pivot angle on the other. The pivot angle can be between 5° and 30°. Of course, the ball joint connection 45 can be made so that the first end 43 comprises the shell and the radially external shroud 20 carries the ball head.

Referring to FIG. 3, the second end 44 of each connecting rod 38 is connected to the radially external shroud 35 of the inter-compressor casing 33 via an embedded type connection 46. In particular, the second end 44 comprises a lug 44*a* which extends the connecting rod along the axis B and which is defined in a plane perpendicular to the radial axis. This lug is mounted on one side of an upstream annular edge 35*a* of the radially external shroud 35 of the inter-compressor casing 33. In other words, this edge 35*a* and the lug 44*a* are radially superimposed. In addition, attachment members 47 allow to secure the second end 44 to said edge 35. To this end, the lug 44*a* comprises a hole 48 (shown in dotted line) passing through its wall on either side along an axis (radial axis Z here) perpendicular to the plane of the lug. The edge 35*a* comprises a plurality of radial orifices 49 (shown in dotted line) which pass through its wall on both sides and which are distributed around the axis X. The attachment members 47 comprise, in the present example, screws 50 each having a head and a rod of radial axis. Each screw 50 passes through a hole 48 formed in a lug of a connecting rod and the corresponding orifice 49 in the edge 35*a*. The attachment members 47 further comprise nuts 51 to tighten the assembly.

The ball joint connection 45, in particular upstream, allows easy access to the low-pressure compressor compartment to check the health of the compressor with a endoscope, for example, or to reposition other members in the vicinity, such as annulus of variable stator vanes. Dismounting the second end 44 downstream will allow the connecting rod 38 to be manipulated by pivoting it through the ball joint connection to gain access to the low-pressure compressor.

Each sleeve 37 is located axially in the middle of each connecting rod 38. In other words, each connecting rod 38 extends on either side of the cylindrical skirt 39. Similarly, the connecting rods 38 are located approximately one third of the height of the sleeves 37 measured between their first and second borders 40, 41, and starting from the second border 41. In this way, the second border 41 is located radially outside the inlet casing 17 and/or the inter-compressor casing 33. Similarly, we understand that the connecting rods connect the first casing and second casing via the sleeves. The first and second casings are substantially contiguous. This allows the turbine engine module and the turbine engine to be made more compact.

A connecting rod 38 and a sleeve 37 form a monobloc part. Advantageously, but not restrictively, the connecting rod 38 is formed integrally (in one piece) with a sleeve 37. Advantageously, this connecting rod and sleeve assembly is produced by an additive manufacturing method. Alternatively, the connecting rod 38 and its sleeve 37 are manufactured separately (e.g., by metal casting or machining) and then joined together by welding or other similar attachment means.

The connecting rods 38 are made of a metallic material. Advantageously, the connecting rods are made of titanium.

With the geometry of the connecting rods (here elongated in the shape of a capital I) and its material (titanium), the torsion angles due to the forces of the stator vanes 28 are relatively low.

Alternatively, each connecting rod has a Y or triangle shape. Similarly, other types of embedded connections can be considered.

With reference to FIG. 3, the stator vanes 28 are advantageously variable in pitch setting so as to optimise the performance of the turbine engine. For this purpose, the turbine engine 1 comprises a further pitch change system 55 for changing the pitch of the blades of the stator vanes 28. We can see that the root 30 of each vane 28 is typically in the form of a pivot 56 which is pivotally mounted along an axis C in the internal housing of the sleeve 37. The axes A and C are coaxial. The pivot 56 of the root 30 is pivotally mounted by means of at least one guide bearing 57 in the internal housing of each sleeve 37. In the present example, two guide bearings 57, 57' are superimposed along the radial axis Z (or axis A of the sleeve 37). These bearings 57, 57' are preferably, but not restrictively, rolling bearings. The bearings 57, 57' may be larger in diameter than usual due to the space available in the sleeves 37 and their location in an annular space between the inlet casing and the inter-compressor casing 33.

Each bearing 57, 57' comprises an internal ring 58 that is secured in rotation to the pivot 56 and an external ring 59 that surrounds the internal ring 58. The bearings comprise rolling members 60 which are installed between the internal surfaces of the internal and external rings which form raceways. The rolling members 60 here comprise balls. The bearings 57, 57' advantageously ensure that the vanes 28 are retained in the housing of the sleeves 37.

A cylindrical socket 61 with a radial axis is installed in a bore 42 of each sleeve 37 so as to connect the internal ring 58 of each bearing to the root of each stator vane 28. The socket 61 is centred on the pitch axis C of the stator vanes 28. Each socket 61 is also provided with internal splines which are arranged on an internal cylindrical face and which are intended to couple with external splines provided on an external surface of the pivot 56 of each stator vane root 28. A spacer 62 is also arranged radially between each bearing so as to ensure the radial spacing of the bearings. Indeed, they have to take up the forces, but also the moments. Consequently, two bearings are needed at intervals to ensure that the bending moment can be absorbed. This spacer 62 is advantageously, but not restrictively, placed between two internal rings of the bearings. Sealing elements are provided in each bore 42 so as to prevent the leakage of lubricant from the bearings towards the outside thereof.

As can also be seen in FIG. 3, two hoops are arranged between the internal wall of each sleeve 37 and the lateral flanks of the bearings 57, 57'. A first hoop 63 has an L-shaped axial cross-section with a branch that radially overlaps the (radially upper) bearing 57', and a second hoop 64 has an I-shaped (capital letter) axial cross-section with an axial bulge. The bearing 57 (radially lower with respect to the radial axis Z and according to FIG. 3)) is bearing on the axial bulge. Advantageously, the first and second hoops 63, 64 each have an annular shape and fit into each other. The hoops 63, 64 allow a radial blocking of the bearings.

The pitch change system 55 comprises at least one control means 66 and at least one connection mechanism 65 connecting each stator vane 28 to the control means 66. The pitch change system 55 is arranged in an annular space defined in the inter-duct casing 18. In particular, the pitch change system 55 is located radially outside the inter-compressor casing 33. More specifically, the control means 66 is located downstream of the sleeves 37 and the connecting rods 38. This is because there is more room to install such a mechanism and the attachment means of the roots 30 of the vanes. We understand that the sleeves are also located in this annular space of the inter-duct casing 18 and as shown in FIG. 1.

In FIG. 3, the pivot 56 of each root 30 comprises an arm 67 forming an eccentric at its lower free end. Advantageously, but not restrictively, the pivot 56 comprises a radial bore which opens at the level of the free end thereof. An attachment member 68 such as a screw is received in the radial bore to attach the arm 67 to the root of the stator vane 28. In the example shown, there are as many arms as there are stator vanes 28. The arm 67 is connected to a first end of a link (shown in dotted line) which forms the connection mechanism 65. The first end of the link is provided with a ball joint through which passes an articulation axle carried by the arm 67. The articulation axle is parallel to the radial axis Z. The second end of the link (opposite the first end) is connected to the control means 66.

The control means 66 is advantageously an actuator such as a hydraulic ram. The actuator comprises a stationary body and a movable body with respect to the first stationary body. The first stationary body is connected to a stationary shroud of the turbine engine so as to be immovable in translation and rotation. In particular, the stationary shroud is mounted on the stationary inter-duct casing. The movable body moves in translation axially with respect to the stationary body along the longitudinal axis X. The movable body comprises an axial rod, the free end of which is connected to the second end of the link. The actuator is connected to a fluid supply source to supply pressurised oil to chambers (not shown) of the stationary body. In this example, the radially external shroud 35 of the inter-compressor casing 33 comprises a plurality of slots 69 extending through the wall thereof on either side and along the longitudinal axis X. At least a portion of each axial rod is intended to pass through a slot 69. There are as many slots 69 as there are rods or links. The control means 66 is located downstream of the inter-compressor casing 33.

Figure 4:
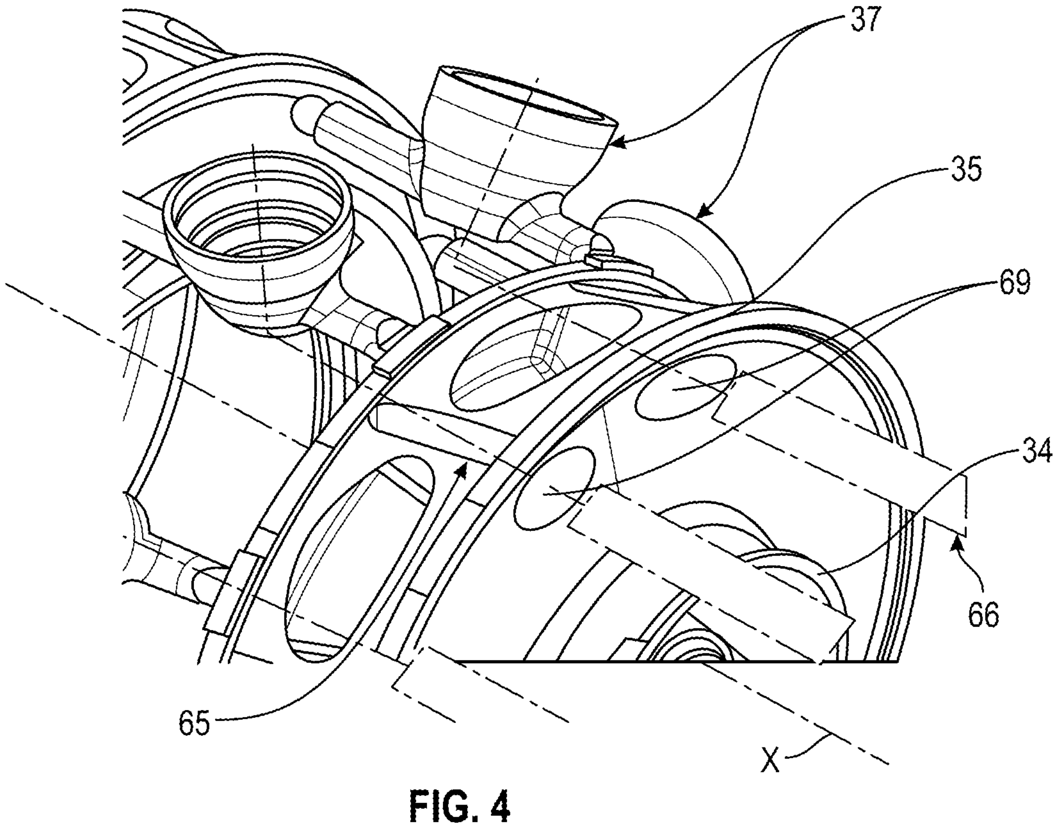
FIG. 4 shows a perspective view of a rear view of an embodiment of an inter-compressor casing according to the invention.

In another embodiment illustrated in FIG. 4, the control means 66 advantageously comprises several actuators such as hydraulic rams. Each actuator is connected to a link which at least partly passes through a slot.

Thus, the stator vanes 28 are moved away from the vanes of the propeller 2 without impacting the length of the turbine engine and without penalising its overall dimension, in particular to install a pitch change system 55 for the straightener. The connecting rods 38 allow thrust forces to pass from the upstream side of the turbine engine through the inlet casing 17 and then the inter-compressor casing 33 and the aerodynamic forces acting on the vanes 28. With this configuration, there is no need to add an extra part.

For this purpose, the ratio S/C corresponding to the distance S between a trailing edge of the vanes of the propeller 2 and the leading edge 31 of the stator vanes 28 on the chord C of the vanes of the propeller 2 is improved. This ratio is of the order of 3, whereas in the prior art this ratio is between 1 and 2. The minimum ratio for compliance with noise standards is 1.

The invention claimed is:

1. A turbine engine module of longitudinal axis X, comprising an unducted propeller intended to be driven in rotation about the longitudinal axis X by a power shaft which is connected to at least one rotor member, at least one straightener comprising a plurality of stator vanes extending along a radial axis Z, at least one first casing mounted upstream along the longitudinal axis of the rotor member and a second casing mounted downstream along the longitudinal axis of the rotor member, wherein the stator vanes comprise roots housed respectively in sleeves, each sleeve is connected to the first casing and to the second casing, wherein the first casing and the second casing are distinct from each other and are linked to the sleeves by a plurality of connecting rods.

2. The turbine engine module according to claim 1, wherein a plurality of connecting rods extend between the first casing and the second casing, each connecting rod carrying on of the sleeves.

3. The turbine engine module according to claim 2, wherein each connecting rod comprises a first end mounted on a first radially external shroud of the first casing by a ball joint type connection and a second end mounted on a second radially external shroud of the second casing by an embedded type connection.

4. The turbine engine module according to claim 2, wherein each connecting rod is made in one-piece with one of the sleeves.

5. The turbine engine module according to claim 1, wherein the stator vanes of the straightener are of variable pitch setting and in that it comprises a pitch change system for changing the pitch of the blades of the stator vanes which is arranged radially outside the second casing.

6. The turbine engine module according to claim 1, wherein at least one rotational guide bearing for guiding in rotation one of the roots of the stator vanes is housed in an internal housing of one of the sleeves.

7. The turbine engine module according to claim 1, wherein the stator vanes are evenly distributed around the longitudinal axis X and extend radially into a secondary air flow.

8. The turbine engine module according to claim 1, wherein the first casing is an inlet casing comprising a first radially internal shroud, the first radially external shroud and between which extends at least a first radial structural arm.

9. The turbine engine module according to claim 3, wherein the second casing is an inter-compressor casing arranged downstream of a low-pressure compressor, along the longitudinal axis, the inter-compressor casing comprising a second radially internal shroud, the second radially external shroud which are coaxial with the longitudinal axis X and between which extends at least one second radial structural arm.

10. The turbine engine module according to claim 1, wherein a ratio S/C corresponding to a distance S on a chord C is of the order of 3, wherein the distance S is measured between a trailing edge of a vane of the propeller and a leading edge of one of said stator vanes, and the chord C is a straight line connecting the leading edge and the trailing edge of the vane of the propeller.

11. The turbine engine module according to claim 1, wherein the first casing and the second casing are separated by the rotor member along the longitudinal axis X.

12. The turbine engine module according to claim 1, wherein the stator vanes of the straightener are unducted.

13. An aircraft turbine engine comprising at least one turbine engine module according to claim 1 and a gas generator downstream of the propeller.

14. The turbine engine module according to claim 1, wherein each sleeve is distinct from the first casing and the second casing.

15. The turbine engine module according to claim 1, wherein each sleeve comprises a cylindrical skirt with an axis parallel to the radial axis Z, each sleeve comprises a bore passing through the cylindrical skirt on either side along said axis, each bore forming an internal housing for receiving the root the stator vane.

16. A turbine engine module of longitudinal axis X, comprising an unducted propeller intended to be driven in rotation about the longitudinal axis X by a power shaft which is connected to at least one rotor member, at least one straightener comprising a plurality of stator vanes extending along a radial axis Z, at least one first casing mounted upstream along the longitudinal axis of the rotor member and a second casing mounted downstream along the longitudinal axis of the rotor member, wherein the first casing and the second casing are separated by the rotor member along the longitudinal axis X, wherein the stator vanes comprise blades and roots linked to the blades and housed respectively in sleeves, the sleeves being evenly distributed around the longitudinal axis and around the rotor member, each sleeve is connected to the first casing and to the second casing, wherein at least one rotational guide bearing for guiding in rotation one of the roots of the stator vanes is housed in an internal housing of one of the sleeves, wherein the at least one rotation guide bearing comprising an internal ring that is secured in rotation to the root and an external ring that surrounds the internal ring, the external ring is secured to an internal wall of said one of the sleeves, wherein each sleeve is distinct from the first casing and the second casing, and wherein the roots have a radially internal free end with regards to the radial axis and which is opposite of the blade of each stator vane, the radially internal free end being outside the sleeve and an arm forming an eccentric connection at the radially internal free end, the arm being connected to at least one connection mechanism of a pitch change system.

17. The turbine engine module according to claim 16, wherein the sleeves are radially arranged around the rotor member.

18. The turbine engine module according to claim 16, wherein the first casing and the second casing are linked to the sleeves by a plurality of connecting rods.

* * * * *